US012790930B1

(12) United States Patent
Karadkar

(10) Patent No.: US 12,790,930 B1
(45) Date of Patent: Nov. 10, 2026

(54) SYSTEMS AND METHODS FOR RECOVERING CARBON DIOXIDE FROM A FOAMED ACID HYDRAULIC FRACTURING OPERATION

(71) Applicant: Saudi Arabian Oil Company, Dhahran (SA)

(72) Inventor: Prasad Baburao Karadkar, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/225,544

(22) Filed: Jun. 2, 2025

(51) Int. Cl.

| | |
|---|---|
| ***E21B 43/34*** | (2006.01) |
| ***C09K 8/70*** | (2006.01) |
| ***C09K 8/72*** | (2006.01) |
| ***E21B 43/16*** | (2006.01) |
| ***E21B 43/267*** | (2006.01) |
| ***E21B 43/27*** | (2006.01) |
| ***E21B 43/40*** | (2006.01) |

(52) U.S. Cl.
CPC .............. *E21B 43/27* (2020.05); *C09K 8/703* (2013.01); *C09K 8/72* (2013.01); *E21B 43/164* (2013.01); *E21B 43/267* (2013.01); *E21B 43/34* (2013.01); *E21B 43/40* (2013.01)

(58) Field of Classification Search
None
See application file for complete search history.

(56) References Cited

U.S. PATENT DOCUMENTS

| | | | | |
|---|---|---|---|---|
| 12,121,851 | B1 | 10/2024 | Alshehry et al. | |
| 2014/0251625 | A1* | 9/2014 | Nelson | C09K 8/88 166/308.5 |
| 2017/0157555 | A1* | 6/2017 | Karode | C10L 3/104 |
| 2021/0262320 | A1 | 8/2021 | Nguyen et al. | |
| 2022/0062818 | A1* | 3/2022 | Choi | B01D 53/8618 |
| 2025/0109664 | A1 | 4/2025 | Khan et al. | |

OTHER PUBLICATIONS

Bhole et al., "Nitration and amination of polyphenylene oxide: Synthesis, gas sorption and permeation analysis", European Polymer Journal, vol. 43, pp. 1450-1459, 2007.
Chan et al., "CO2 Removal from Natural Gas Using Membrane Contractor", Offshore Technology Conference, OCT-24935-MS, 2014.

(Continued)

*Primary Examiner* — Andrew Sue-Ako
(74) *Attorney, Agent, or Firm* — DINSMORE & SHOHL LLP

(57) ABSTRACT

A method for recovering carbon dioxide from a foamed acid hydraulic fracturing operation, the method comprising: introducing a foamed acid from a surface location into a wellbore fluidly connected to a subsurface formation, the foamed acid comprising an aqueous solution, an acid, and carbon dioxide; exposing the foamed acid to a first zone of the subsurface formation, thereby inducing one or more fractures in the first zone of the subsurface formation; receiving a return portion of the foamed acid from the subsurface formation at the surface location via the wellbore; and introducing the return portion of the foamed acid to a separation unit comprising a polybenzimidazole (PBI) membrane, thereby forming a carbon dioxide-rich permeate stream and a carbon dioxide-poor retentate stream.

20 Claims, 8 Drawing Sheets

(56) References Cited

OTHER PUBLICATIONS

Dengel et al., "Streamlined Natural Gas Treatment by Membranes Only", Offshore Technology Conference, OTC-24489-MS, 2019.
Drake et al., "New Polymeric Materials Development for Extreme Environments", Offshore Technology Conference, OTC-25304-MS, 2014.
Kumbharkar et al., "Enhancement of gas permeation properties of polybenzimidazoles by systematic structure architecture", Journal of Membrane Science, vol. 286, pp. 161-169, 2006.
Singh et al., "High Temperature Polybenzimidazole Hollow Fiber Membranes for Hydrogen Separation and Carbon Dioxide Capture for Synthesis Gas", Energy Procedia, vol. 63, pp. 153-159, 2014.
Zhu et al., "Unlocking the potential of hydraulic fracturing flowback and produced water for CO2 removal via mineral carbonation", Applied Geochemistry, vol. 142, 105345, 13 pages, 2022.
Notification of Transmittal of the International Search Report and the Written Opinion of the International Searching Authority, or the Declaration dated Sep. 16, 2026 pertaining to International application No. PCT/US2026/029886 filed May 27, 2026, pp. 1-13.

* cited by examiner

SYSTEMS AND METHODS FOR RECOVERING CARBON DIOXIDE FROM A FOAMED ACID HYDRAULIC FRACTURING OPERATION

FIELD

The present disclosure relates to the field of hydraulic fracturing. More particularly, it relates to the field of hydraulic fracturing utilizing foams, such as foamed acids, as well as recovering the carbon dioxide used therewith, as detailed herein.

BACKGROUND

In subsurface oil and gas recovery, wellbore stimulation is a common treatment performed in subsurface formations to enhance or restore the productivity of oil and gas from a wellbore. Acid treatments may be used for wellbore stimulation. Acidizing is a stimulation acid treatment technique in which a foamed acid including aqueous acid solution is delivered into the subsurface formation to dissolve acid-soluble materials. This may increase the permeability of a treatment zone and enhance well production by increasing the effective wellbore radius. Acidizing is regarded as the process of pumping acid into a wellbore or subsurface formation to improve a well's productivity.

Acidizing commonly occurs in two forms, matrix acidizing and fracture acidizing. Matrix acidizing is regarded as acidizing below subsurface formation breakdown pressure. Fracture acidizing is regarded as acidizing above formation pressure. Acidizing may commonly improve a well's productivity by dissolving material in a subsurface formation that blocks flow paths to the wellbore. Acidizing may also improve a well's productivity by dissolving the formation rock, thereby creating new flow paths to the wellbore or enlarging pre-existing ones. Acidizing above formation pressure, as in fracture acidizing, may cause fractures to form in the subsurface formation, increasing the area in which the acid may potentially dissolve rock and enlarge fluid flow paths.

SUMMARY

There may be various kinds of acids treatments used in fracture acidizing. One such type is foam acidizing, in which an aqueous-based acid is foamed utilizing a gas (such as carbon dioxide) and/or a foaming agent to produce a foamed acid. Foamed acids have the benefit of reducing the needed water to hydraulically fracture and/or acidize a well, as well as increasing acid diversion, increasing fracture length and conductivity. Further, by virtue of the composition being primarily gas (carbon dioxide), flowback of the well is increased.

Particularly, after wellbore completion and stimulation activities are concluded, the wellbore is opened and allowed to equalize to surface pressure, erratically producing subsurface oil, gas, and water. Further, by this point the foamed acid often becomes unstable, resulting in the breakout of the carbon dioxide portion. Accordingly, flowback fluids in this situation can also contain a substantial amount of carbon dioxide.

Consequently, it may be desired to capture the produced carbon dioxide to reduce greenhouse gas emissions and/or to re-use the carbon dioxide for further foamed acid treatments. Embodiments herein may fulfill the aforementioned need by providing systems and methods for recovering the carbon dioxide. Particularly, methods and systems herein may provide a separation unit comprising a polybenzimidazole (PBI) membrane which may operate to separate carbon dioxide from hydrocarbons and other subsurface liquids, after which the carbon dioxide may be stored and/or re-used as necessary.

In accordance with one embodiment herein, a method for recovering carbon dioxide from a foamed acid hydraulic fracturing operation, may comprise: introducing a foamed acid from a surface location into a wellbore fluidly connected to a subsurface formation, the foamed acid comprising an aqueous solution, an acid, and carbon dioxide; exposing the foamed acid to a first zone of the subsurface formation, thereby inducing one or more fractures in the first zone of the subsurface formation; receiving a return portion of the foamed acid from the subsurface formation at the surface location via the wellbore; and introducing the return portion of the foamed acid to a separation unit comprising a polybenzimidazole (PBI) membrane, thereby forming a carbon dioxide-rich permeate stream and a carbon dioxide-poor retentate stream.

In accordance with another embodiment herein a system for recovering carbon dioxide from a foamed hydraulic fracturing operation may comprise: a wellhead comprising one or more fluid injection lines and one or more fluid return lines, the wellhead fluidly connected to a wellbore that is fluidly connected to a subsurface formation; one or more fluid injection pumps fluidly connected to the wellhead via the one or more fluid injection lines, the one or more fluid injection pumps configured to supply a foamed acid to the subsurface formation; and a separation unit fluidly connected to the wellhead via the one or more fluid return lines, the separation unit comprising a polybenzimidazole (PBI) membrane.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The following detailed description of specific embodiments of the present disclosure can be best understood when read in conjunction with the following drawings, where like structure is indicated with like reference numerals and in which.

Figure

Figure 1:
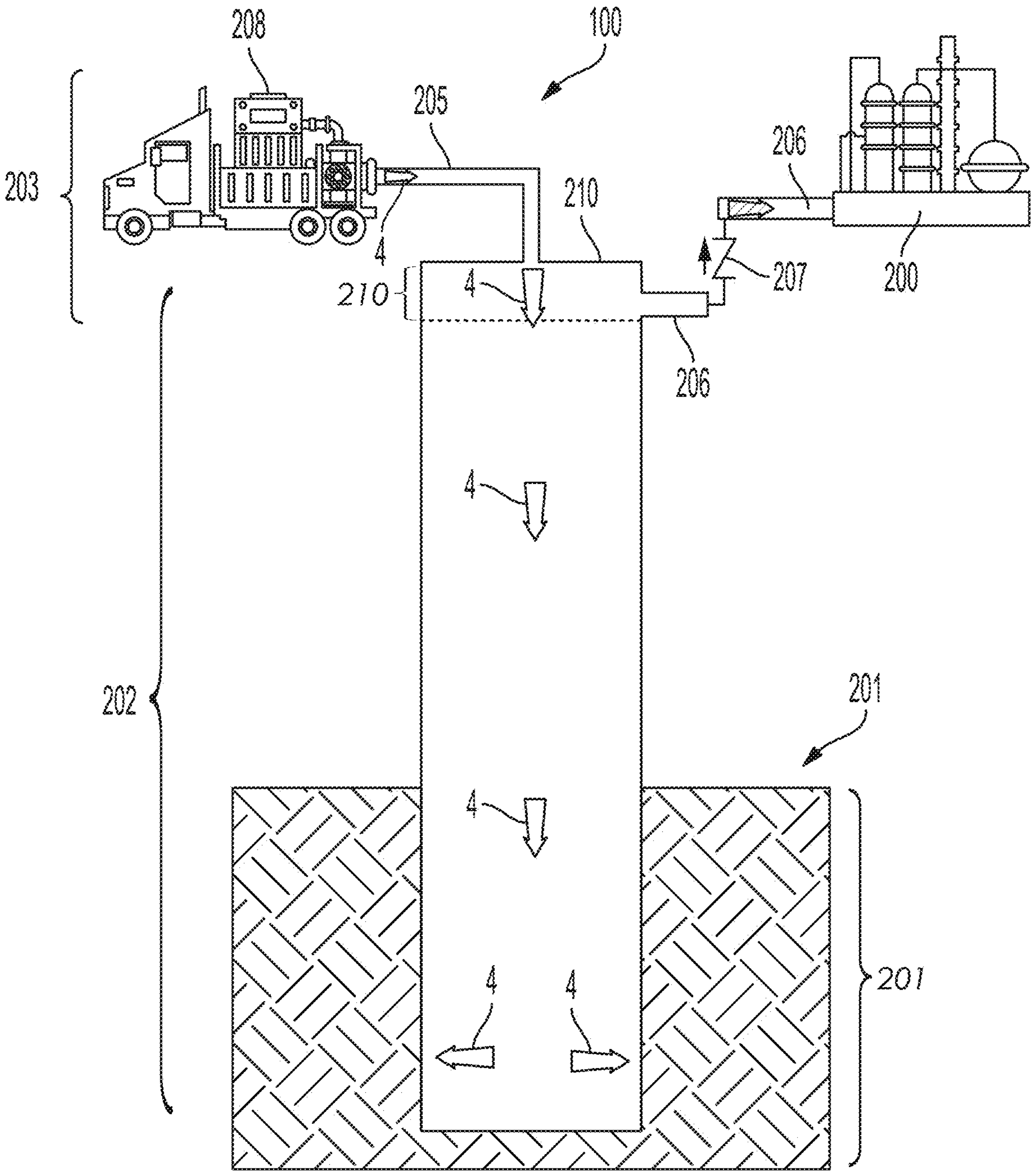
(FIG. 1 illustrates a system for recovering carbon dioxide from a foamed acid hydraulic fracturing operation, particularly illustrating the introduction step of the foamed acid, according to embodiments herein.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines, which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows, which do not connect two or more system components, signify a product stream, which exits the depicted system, or a system inlet stream, which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in embodiments, less than all of the stream signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like separation unit, pumping unit, storage container, or other system component. For example, when two streams are depicted to independently enter a system component, they may in embodiments be mixed together before entering that system component.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

As previously stated, embodiments described herein generally relate to the field of hydraulic fracturing. More particularly, embodiments herein relate to the field of hydraulic fracturing utilizing foams, such as foamed acids, as well as recovering the carbon dioxide used therewith, as detailed herein.

As used throughout this disclosure, the term "foamed acid" may also be referred to as an "energized acid." Energized fluids refer to fluids with one or more compressible gas components dispersed in a volume of liquid. As used throughout this disclosure, the terms "foamed acid" or "energized acid" may refer to an energized fluid wherein the liquid is an acid.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

Figure 2:
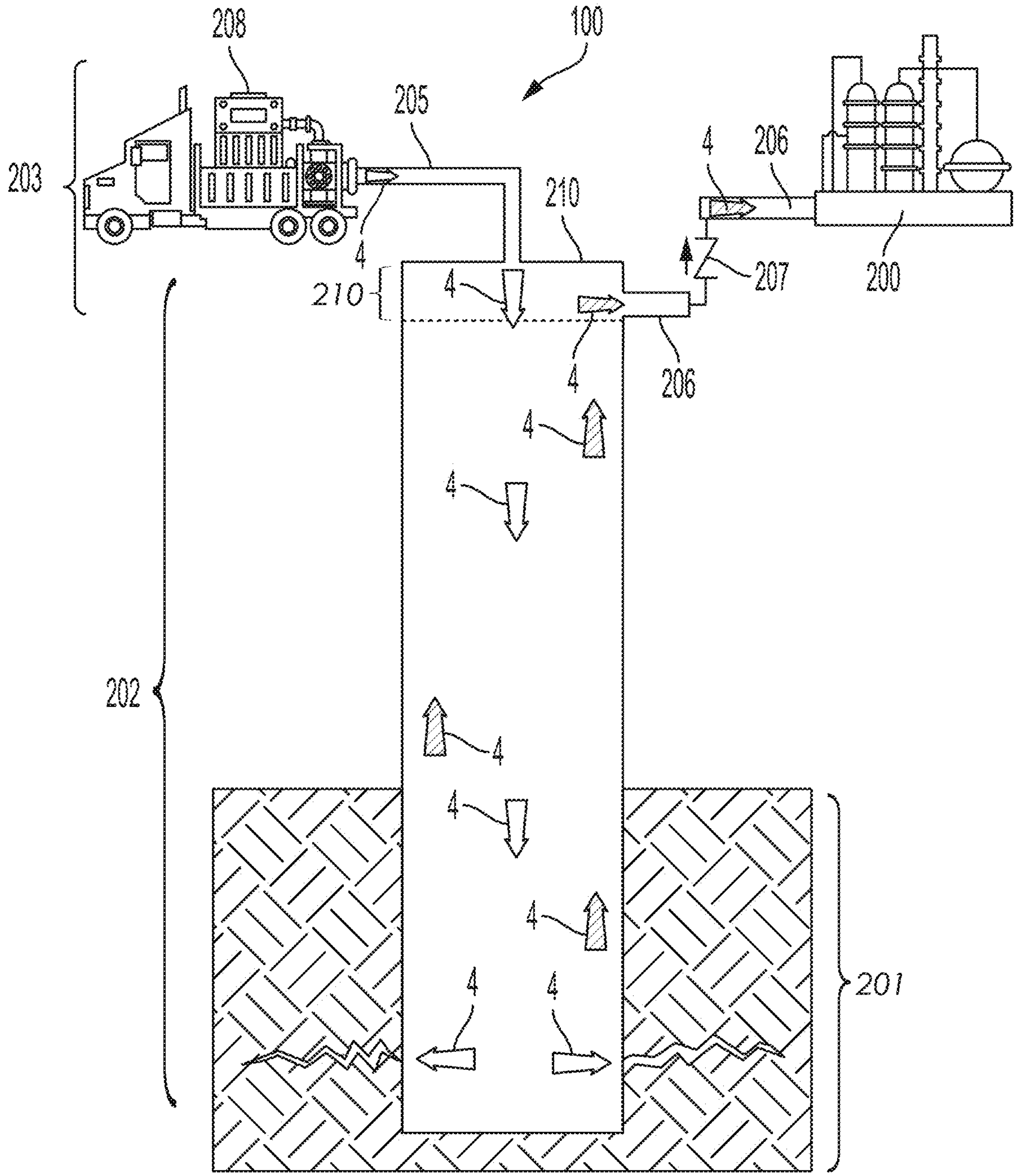
FIG. 2 illustrates the system of FIG. 1, particularly illustrating exposing and flowback/receiving returns steps, according to embodiments herein.
Figure 3:
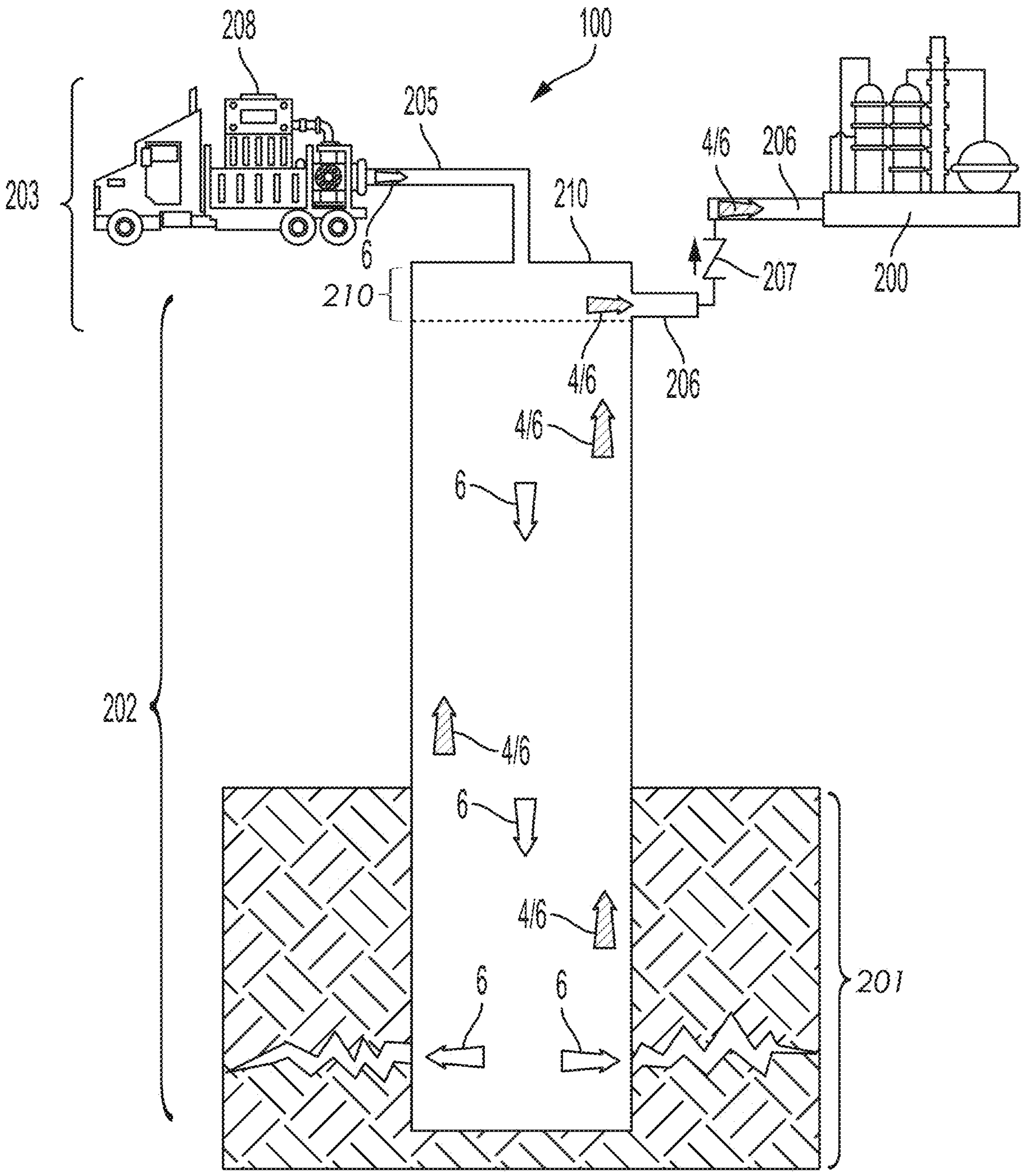
FIG. 3 illustrates the system of FIGS. 1-2, particularly illustrating the introduction, exposing, and flowback/receiving returns steps of a hydraulic fracturing composition in addition to the foamed acid, according to embodiments herein.

Referring initially to FIGS. 1-3, illustrated are systems 100 for recovering carbon dioxide from a foamed acid hydraulic fracturing operation, such as by utilizing a foamed acid 4. In one or more embodiments herein, the foamed acid 4 may comprise an aqueous solution, an acid, and a gaseous component dispersed in the aqueous solution, or vice versa, such as but not limited to carbon dioxide, nitrogen, or any other inert gas. Particularly, in at least some embodiments, the gaseous component may comprise carbon dioxide.

As previously stated, the foamed acid 4 may also comprise an acid. The acid may be any acid known in the art, such as, but not limited to hydrochloric acid, sulfuric acid, nitric acid, acetic acid, or combinations thereof. The acid may also comprise a chelating agent, such as, but not limited to ethylenediamine tetra-acetic acid (EDTA), diethylenetriamine pentaacetic acid (DTPA), L-glutamic acid N, N-diacetic acid (GLDA), or combinations thereof.

Also as previously stated, the foamed acid 4 may comprise an aqueous solution. The aqueous solution may comprise distilled water, deionized water, or tap water. In embodiments, the aqueous solution may additionally comprise additives or contaminants. For example, the aqueous solution may comprise freshwater, seawater, natural brine, synthetic brine, formation water, salt water, pond water, or combinations thereof.

In embodiments, the foamed acid 4 may also comprise one or more additional components, such as, but not limited to, a foaming agent, a proppant, a gelling agent, a gel stabilizer, a crosslinker, a surfactant, a clay stabilizer, a corrosion inhibitor, a scavenger, or combinations thereof.

As described herein, a "foaming agent" refers to an additive that entrains gas within a fluid, creating a foam solution with a lowered density than before the gas was entrained. The foaming agent may include quaternary organosilane, didecyldimethylammonium chloride, a cocamine oxide surfactant, an alkyl imidazoline surfactant, poly [dimethylsiloxane-co-[3-(2-(2-hydroxyethoxy) ethoxy) propyl]methylsiloxane], or combinations thereof.

As previously stated, the foamed acid 4 may further comprise a gelling agent, a gel stabilizer, or both. The gelling agent may include guar, hydroxyethyl cellulose, xantham gum, or combinations thereof. The gel stabilizer may include methanol, sodium thiosulfate, or both. Gelling agents typically operate by increasing the viscosity of the fluid the gelling agent is present in, thereby creating a gelled fluid. Gel stabilizers typically operate by stabilizing the viscosity of a gelled fluid at extreme temperatures or by extending the crosslinked time of a crosslinked fluid.

Also as previously stated, the foamed acid 4 may further include a crosslinker. The crosslinker may include borate, zirconium, chromium, antimony, titanium salts, or combinations thereof. A crosslinker is an additive which links two polymer chains by a covalent or ionic bond. Crosslinking may result in a large increase in viscosity and additional stability of a polymer molecule. The foamed acid 4 may further include a surfactant. The surfactant may include sodium laureth sulfate, cetyl trimethylammonium bromide, or both. A surfactant is an additive that typically preferentially adsorbs at an interface, lowering the surface tension or interfacial tension between two substances. In embodiments, the surfactant may increase the amount of the foamed acid 4 that may be flowed back or otherwise recovered from the subsurface formation 201 by lowering the interfacial tension between the subsurface formation 201 and the foamed acid 4.

In embodiments, the foamed acid 4 may include a clay stabilizer. Clay stabilizers are additives that inhibit the swelling or migration of clays. Clay stabilizers may include potassium chloride, bis-hexamethylene-triamine, bis-hexamethylene-triamine salts, or combinations thereof.

The foamed acid 4 may also include a corrosion inhibitor. The corrosion inhibitor may include amidoamines, quaternary amines, amides, phosphate esters, or combinations thereof.

In at least some embodiments, the foamed acid 4 may include a scavenger. The scavenger may include a hydrogen scavenger, a hydrogen sulfide scavenger, or both. Hydrogen scavengers may include glyoxal or bis(hydroxyalkyl) hydantoins. Hydrogen sulfide scavengers may include but are not limited to oxidants such as inorganic peroxides such as sodium peroxide, or chlorine dioxide, aldehydes or dialdehydes, such as $C_1$-$C_{10}$ aldehydes, formaldehyde, glutaraldehyde, ((meth)acrolein or glyocxal), triazines such as monoethanol amine triazine, and monomethylamine triazine and hydantoins such as hydroxyalkylhydantoins, bis(hydroxyalkyl) hydantoins and dialkylhydantoins where the alkyl group is a $C_1$-$C_6$ alkyl group.

Now referring back to FIGS. 1-3, the system 100 may comprise a subsurface formation 201, a wellbore 202, a surface location 203, and a wellhead 210. Moreover, while the wellbore 202 and the subsurface formation 201 are shown to be vertical, the wellbore 202 in at least some embodiments may at least partially horizontal, i.e., the wellbore 202 may be part of a horizontally drilled well, as may be understood in the art. The subsurface formation 201 may comprise an unconventional reservoir, such as a shale.

As shown in FIGS. 1-3, the wellbore 202 may be fluidly connected to the subsurface formation 201, such as by the wellbore wall. The wellbore 202 may also be fluidly connected to the wellhead 210 positioned at the surface location 203, such as through a tubing string 204 (not illustrated), which may be positioned within the wellbore 202. For example, and in one or more embodiments, the tubing string 204 may provide a fluid conduit from the surface location 203 to a termination point in the wellbore 202 proximal the subsurface formation 201, such that fluid injected into the tubing string 204 is primarily exposed to the subsurface formation 201, however this is not required. The tubing string 204 may be provided at least temporarily in the wellbore 202 by utilizing coiled tubing, although this is not required.

Still referring to FIGS. 1-3, the system 100 may further comprise one or more fluid injection pumps 208 configured to supply the foamed acid 4 to the subsurface formation 201, such as through one or more injection lines 205 fluidly connected to the wellhead 210 and the one or more tubing strings 204. The foamed acid 4 may be supplied to the one or more fluid injection pumps 208 through one or more storage vessels, each storage vessel containing one of the components of the foamed acid 4, or multiple components of the foamed acid 4. For example, and in embodiments, although not shown, the system 100 may further comprise one or more mixers, some of which may be pressurized, for mixing the components prior to introduction into the one or more fluid injection pumps 208.

Moreover, the tubing string 204, the wellhead 210, or both may comprise a one-way valve 207 disposed in the tubing string 204 or the wellhead 210 respectively for preventing backflow up the one or more injection lines 205.

Further, in at least some embodiments, the one or more fluid injection pumps 208 may additionally be configured to supply a hydraulic fracturing composition 6 to the subsurface formation 201, such as through the one or more injection lines 205. Without being limited by theory, and as explained in further detail herein, the exposure of the foamed acid 4 to the subsurface formation 201 may induce one or more fractures in the subsurface formation 201. To increase fracture size, the hydraulic fracturing composition 6 may be supplied after the foamed acid 4. To hold open these fractures, one or both of the foamed acid 4 or the hydraulic fracturing composition 6 may further include a proppant.

The hydraulic fracturing composition 6 may be similar or identical to the foamed acid 4, i.e. the hydraulic fracturing component may include the aqueous solution, the acid, the gaseous component, or the one or more additional components (proppant, gelling agent, gel stabilizer, crosslinker, etc.). In at least one embodiment, the hydraulic fracturing composition 6 may at least include the aqueous solution and the proppant.

As previously stated, embodiments herein may also be directed to methods of recovering carbon dioxide from the foamed acid 4 after exposure to the subsurface formation 201. Accordingly, as shown in FIGS. 1-3, the system 100 may further comprise one or more return lines 206 coupled to the wellhead 210 for receiving return fluids, and particularly return foamed acid 4, from the wellbore 202, such as when flowback operations are conducted. The one or more return lines 206 may be fluidly connected to a separation unit 200 for separating the carbon dioxide, as explained in further detail below.

Further, while the one or more return lines 206 are illustrated as being directly connected to the separation unit 200, it is contemplated that there may be one or more intermediary storage or separation units between the wellhead 210 and the separation unit 200. Further yet, as shown in FIGS. 1-3, a one-way valve 207 may also be disposed in the one or more return lines 206 for preventing backflow up the one or more return lines 206.

Without being limited by theory, the return fluids (i.e. the return portion of the foamed acid or hydraulic fracturing composition, as explained in further detail herein) received at the one or more return lines 206 may depend on the extent of completion operations (hydraulic fracturing), as well as the fluids used. For example, and in embodiments, it may be expected that the return fluids (the return portion of the foamed acid or the return portion of the hydraulic fracturing composition) may include subsurface formation fluids 7 (oil, gas, water), the foamed acid 4, spent acid, by-products of the foamed acid's reactions with the subsurface formation or subsurface formation fluids, carbon dioxide, the hydraulic fracturing composition 6 (if used), broken portions of the hydraulic fracturing composition (if used), or combinations thereof. Further, it may be expected that the return fluids, at least in terms of the foamed acid 4 and the hydraulic fracturing composition 6, may be in a different form than when they were initially introduced into the subsurface formation 201. For example, and in embodiments, the foamed acid 4 and/or hydraulic fracturing composition 6 may have a foam half-life which may expire by the time of flowback. Accordingly, at least some of the gaseous component(s) (carbon dioxide) may break out of the foam.

Further, depending on the nature of the gaseous component(s), some of the gaseous component may actually dissolve in the aqueous solution(s) and/or the formation fluids, such as, but not limited to, carbon dioxide forming carbonic acid. Further yet, in at least some embodiments the foamed acid 4 and/or the hydraulic fracturing composition 6 may comprise proppants. In such an embodiment, some or all of the proppant may remain trapped in the subsurface formation 201, as intended, to maintain fracture conductivity. Accordingly, while the present embodiments may refer to the foamed acid 4 and/or the hydraulic fracturing composition 6 being received by the separation unit 200, it may be understood that not all of the foamed acid 4 and/or hydraulic fracturing composition 6 may be received at the separation unit 200.

Figure 4:
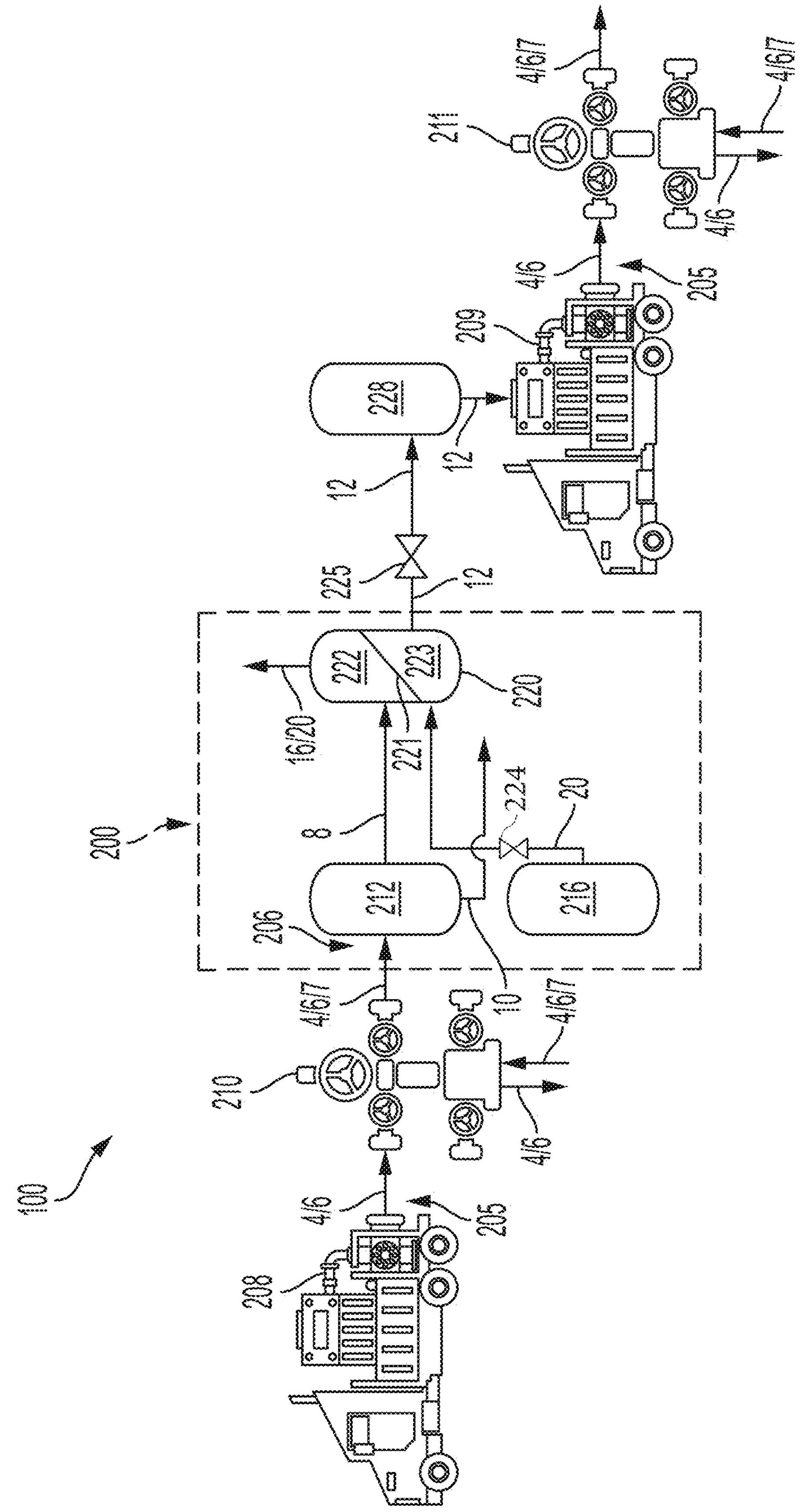
FIG. 4 illustrates an alternate view of the system of FIGS. 1-3, particularly illustrating the surface location operations, and in particular, the introduction/separation steps of the carbon dioxide as well as the optional recycling step to a second wellbore, according to embodiments herein.

Now referring to FIG. 4, and as previously stated, the system 100 may comprise a separation unit 200 for receiving return fluids from the wellbore 202 and subsurface formation 201. The separation unit 200 may comprise a polybenzimidazole (PBI) membrane 221, which may itself be incorporated in a PBI membrane separation unit 220. For example, and as shown in FIG. 4, the PBI membrane 221 may be positioned in the PBI membrane separation unit 220 such that a retentate side 222 and a permeate side 223 are defined in the PBI membrane separation unit 220, and such that fluid flow to the permeate side 223 is only permitted through permeation through the PBI membrane 221. Accordingly, the PBI membrane separation unit 220 may be configured to receive the return portion of the foamed acid 4, the hydraulic fracturing composition 6, and/or the subsurface formation fluids 7 and generate a retentate stream 16 and a permeate stream 12.

As previously stated, the PBI membrane 221 may be positioned in the separation unit 200, and particularly the PBI membrane separation unit 220. In embodiments, the PBI membrane 221 may have a permeability coefficient that is relatively greater for carbon dioxide than for hydrocarbons or aqueous solution. For example, and in at least some embodiments, the PBI membrane 221 may comprise a permeability coefficient $$\left(\frac{\text{permeance}}{\text{membrane thickness}}\right)$$

of approximately 0.16 barrer for carbon dioxide, as compared to approximately 0.0018 barrer for methane, or an approximate selectivity of carbon dioxide to methane.

Accordingly, when receiving the return fluids, the PBI membrane 221 may be configured to preferentially separate the carbon dioxide from the remainder of the foamed acid 4, hydraulic fracturing composition 6, and/or subsurface formation fluids 7.

Further, the PBI membrane 221 may have the additional advantage of being thermally and mechanically stable when exposed to the foamed acid 4, hydraulic fracturing composition 6, and/or subsurface formation fluids 7, which may often be at an increased temperature due to exposure to the subsurface formation 201. For example, and in embodiments, the PBI membrane 221 may have a glass transition temperature of approximately 416° C. and a density of approximately 1.33 g/cm$^3$, both of which are higher than other comparable gas separation membranes. Further, without being limited by theory, the higher glass transition temperature and greater mechanical stability may be of particular advantage in allowing the separation of the return fluids at relatively higher temperatures and pressures, reducing the chance of deposition of scale or paraffin wax depositing (temperature-induced) or gas condensates breaking out of solution (pressure-induced) for return subsurface formations.

As previously stated, the separation unit 200 may comprise the PBI membrane 221. In at least some embodiments, the PBI membrane 221 may be functionalized to increase the permeance of carbon dioxide. For example, and in embodiments, the PBI membrane 221 may comprise polybenzimidazole functionalized by 4,4'-(hexafluoro-isopropylidene) bis(benzoic acid) (PBI-HFA) or polybenzimidazole functionalized by 5-tert-butyl isophthalic acid (PBI-Bul). Approximate properties of the membranes based on the functionalization, or lack thereof, are shown below in Table 1.

TABLE 1

Permeability coefficient and permselectivity of polybenzimidazoles

| | PBI-I | PBI-Bul | PBI-HFA |
|---|---|---|---|
| Permeability, $P_{CO2}$ | 0.16 | 1.91 | 2.91 |
| Permeability, $P_{CH4}$ | 0.0018 | 0.05 | 0.07 |
| Permselectivity ($P_{CO2}/P_{CH4}$) | 89 | 37 | 41 |

Determined at 20 atm upstream pressure, expressed in Barrer (1 barrer = $10^{-10}$ $cm^3$ (STP) cm/$cm^2$ · s · cm Hg).

As previously stated, while the PBI membrane 221 may be thermally and mechanically stable, it may be susceptible to plugging over time, depending on the fluids exposed. Accordingly, referring again to FIG. 4, in at least some embodiments the separation unit 200 may comprise a gas-liquid separator 212 in addition to the PBI membrane separation unit 220. The gas-liquid separator 212 may be positioned upstream from the PBI membrane separation unit 220, and in at least some embodiments, may be interposed between the one or more fluid return lines 206 and the PBI membrane separation unit 220. The gas-liquid separator 212 may be configured to receive the flowed back portion of the foamed acid 4, the hydraulic fracturing composition 6, or the subsurface formation fluids 7. The gas-liquid separator 212 may also be configured to form a liquid stream 10 comprising at least the aqueous solution and a gaseous stream 8 comprising at least the carbon dioxide. The gaseous stream 8 may then be introduced to the PBI membrane separation unit 220 for separation of the carbon dioxide from the remaining gaseous components of the gaseous stream 8.

As previously stated, the PBI membrane 221 may be susceptible to plugging over time, such as with continued exposure to the flowed back portion of the foamed acid 4, the hydraulic fracturing composition 6, or the subsurface formation fluids 7. Accordingly, and still referring to FIG. 4, the separation unit 200 may further comprise a purge gas container 216. The purge gas container 216 may be configured to supply a purge gas stream 20 to the PBI membrane separation unit 220, and particularly from the permeate side 223 to the retentate side 222, for removing any plugs in the PBI membrane 221. In at least some embodiments, the system 100 may also comprise a purge gas compressor 230 for introducing the purge gas stream 20 to the PBI membrane separation unit 220.

Figure 5:
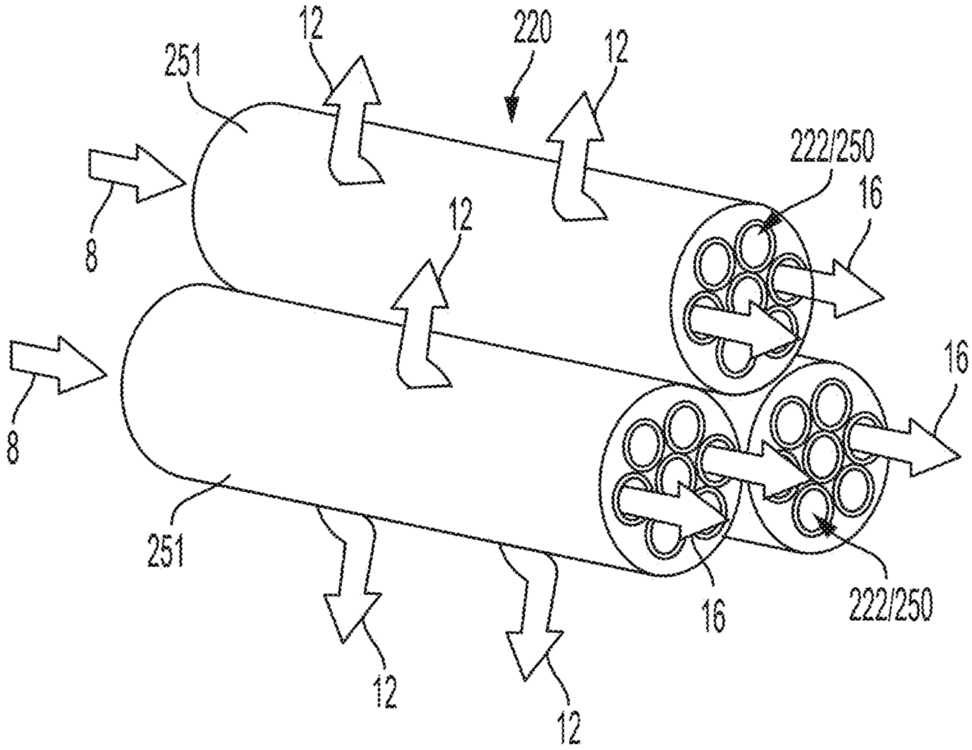
FIG. 5 illustrates one example of a separation unit/PBI membrane separation unit, particularly illustrating a tubular membrane module comprising the plurality of hollow PBI fibers, according to embodiments herein.
Figure 6:
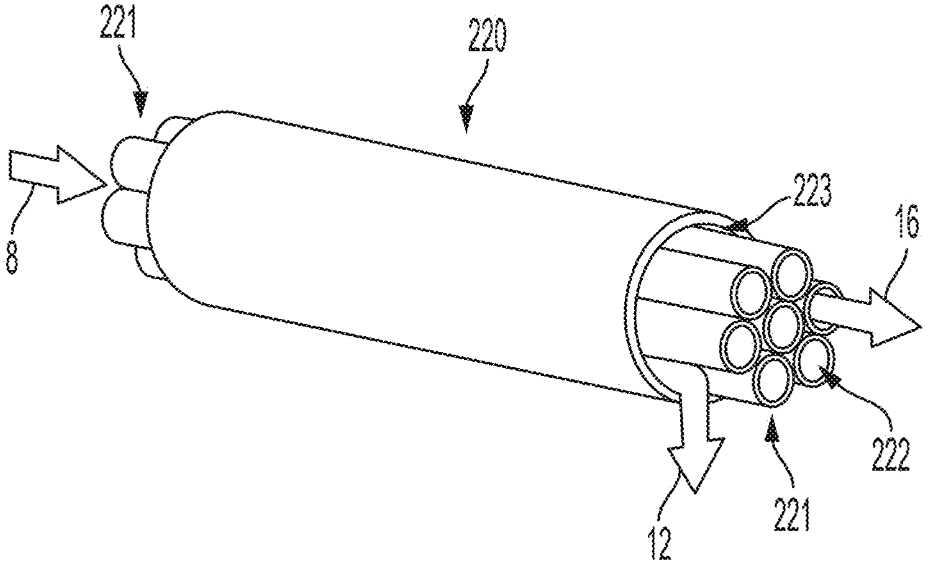
FIG. 6 illustrates another example of a separation unit/PBI membrane separation unit, particularly illustrating a plurality of hollow PBI fibers, according to embodiments herein.

Now referring to FIGS. 5-8, illustrated are various examples of the PBI membrane separation unit 220, and particularly the PBI membrane 221, according to embodiments herein. As shown in FIGS. 5-6, the PBI membrane 221 may be a plurality of hollow PBI fibers, as shown in FIG. 6, or the PBI membrane 221 may be positioned as a coating (not shown) on a plurality of apertures 250 of one or more porous cylinders 251, i.e., as a tubular membrane module, as shown in FIG. 5.

In such embodiments as shown for example in FIG. 5, the exterior of the one or more porous cylinders 251 may be the permeate side 223 and the interior of the plurality of apertures 250 may be the retentate side 222. Accordingly, as shown in FIG. 5, the return portion of the foamed acid 4, the hydraulic fracturing composition 6, and/or the subsurface formation fluids 7, or alternatively the gaseous stream 8, may be provided to the plurality of apertures 250 of the one or more porous cylinders 251, wherein a portion permeated through the PBI membrane and through the one or more porous ceramic cylinders 251 is recovered as the permeate stream 12, and the remaining portion not permeated through PBI membrane and through the one or more porous ceramic cylinders 251 is the retentate stream 16.

Alternatively, in such embodiments as shown for example in FIG. 6, the exterior of the plurality of hollow PBI fibers may be the permeate side 223 and the interior of the plurality of hollow PBI fibers may be the retentate side 222. Accordingly, as shown in FIG. 6, the return portion of the foamed acid 4, the hydraulic fracturing composition 6, and/or the subsurface formation fluids 7, or alternatively the gaseous stream 8, may be provided to the plurality of hollow PBI fibers, wherein a portion permeated through the plurality of hollow PBI fibers is recovered as the permeate stream 12, and the remaining portion not permeated through the plurality of hollow PBI fibers is the retentate stream 16.

Figure 7:
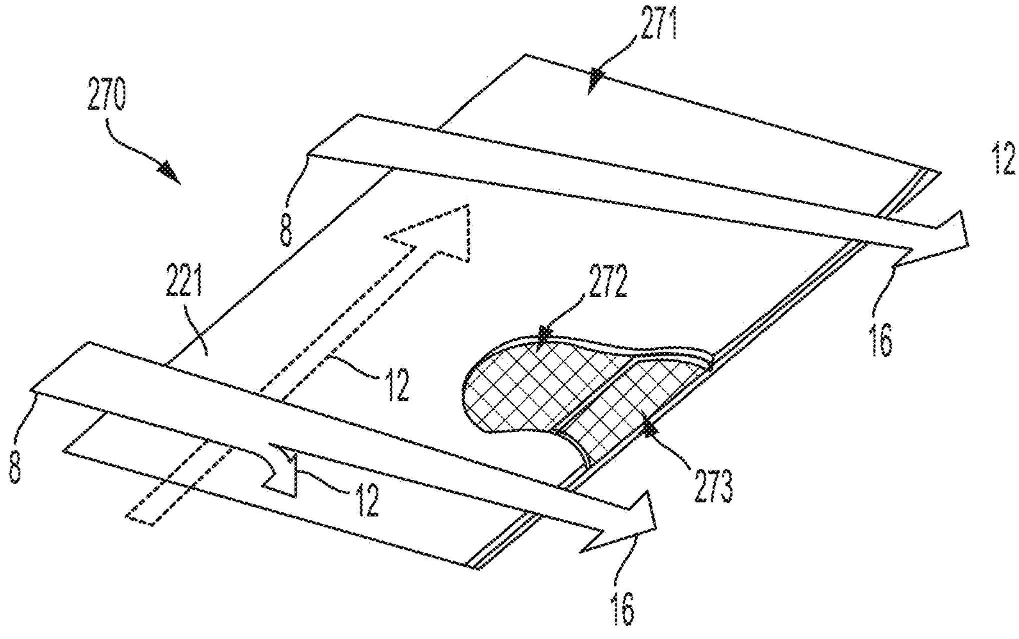
FIG. 7 illustrates another example of a separation unit/PBI membrane separation unit, particularly illustrating a film composite membrane, according to embodiments herein.

Alternatively, the PBI membrane 221 may be film composite membrane 270, as shown for example by FIG. 7. Particularly, as shown in FIG. 7, the PBI membrane 221 may comprise a top 'thin' layer 271 of PBI membrane 221, a middle layer 272 of microporous substrate, and a bottom layer 273 of a porous nonwoven backing. Accordingly, the return portion of the foamed acid 4, the hydraulic fracturing composition 6, and/or the subsurface formation fluids 7, or alternatively the gaseous stream 8, may be provided to the film composite membrane 270, and particularly the top layer 271, wherein a portion permeated through the top layer 271, the middle layer 272, and the bottom layer 273 is the permeate stream 12 and a remaining portion not permeated through is the retentate stream 16.

Accordingly, the return portion of the foamed acid 4, the hydraulic fracturing composition 6, and/or the subsurface formation fluids 7, or alternatively the gaseous stream 8, may be provided to the porous material, wherein a portion permeated through the film composite membrane 221 to the tubular porous support 225 is the permeate stream 12 and a remaining portion not permeated through is the retentate stream 16.

In embodiments, the top layer 171 may have a thickness of from 10 nm to 10,000 nm, such as from 10 nm to 50 nm, from 50 nm to 100 nm, from 100 nm to 400 nm, from 400 nm to 800 nm, from 800 nm to 1000 nm, from 1000 nm to 1200 nm, from 1200 nm to 2000 nm, or combinations of the previous ranges or smaller ranges therein, such as from 10 nm to 100 nm.

In embodiments, the middle layer 172 may have a thickness of from 2 μm to 100 μm, such as from 2 μm to 5 μm, from 5 μm to 10 μm, from 10 μm to 25 μm, from 25 μm to 50 μm, from 50 μm to 75 μm, from 75 μm to 100 μm, or combinations of the previous ranges or smaller ranges therein, such as from 25 μm to 75 μm.

In embodiments, the top layer 173 may have a thickness of from 100 μm to 200 μm, such as from 100 μm to 110 μm, from 110 μm to 120 μm, from 120 μm to 130 μm, from 130 μm to 150 μm, from 150 μm to 175 μm, from 175 μm to 200 μm, or combinations of the previous ranges or smaller ranges therein, such as from 110 μm to 120 μm.

Figure 8:
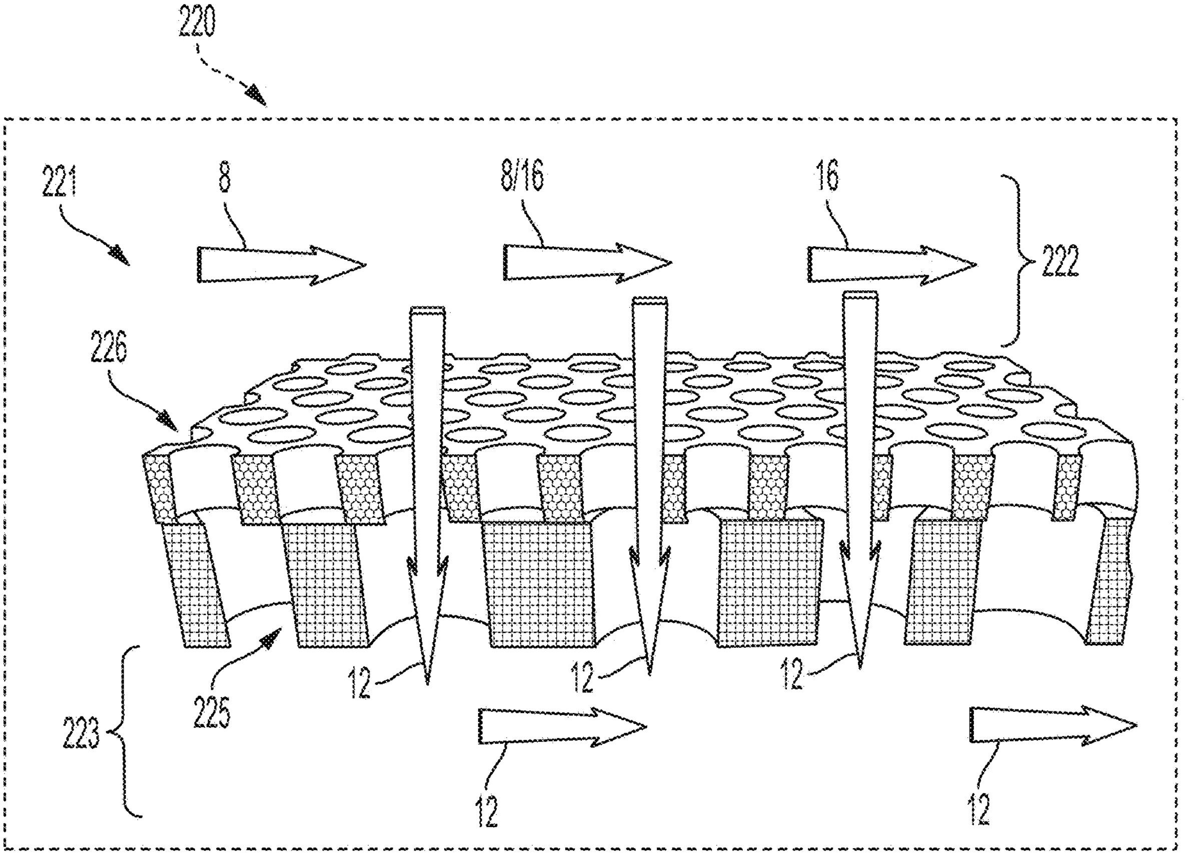
FIG. 8 illustrates another example of a separation unit/PBI membrane separation unit, particularly illustrating a single film membrane on a porous support, according to embodiments herein.

Alternatively, the PBI membrane 221 may be a single film membrane 226 on a porous support 225, as shown for example by FIG. 8. Particularly, as shown in FIG. 8, the PBI membrane 221 may comprise the single film membrane 226 overlain on the porous support 225, the single film membrane 226 side being the retentate side 222 and the porous support 225 side being the permeate side 223. Accordingly, the return portion of the foamed acid 4, the hydraulic fracturing composition 6, and/or the subsurface formation fluids 7, or alternatively the gaseous stream 8, may be introduced to the single film membrane 226, wherein a portion permeated through the single film membrane 226 and the porous support 225 is the permeate stream 12 and a remaining portion not permeated through is the retentate stream 16.

As previously stated, embodiments herein may be directed to systems 100 of recovering carbon dioxide, such as for re-use in foamed acid 4 hydraulic fracturing. Accordingly, as shown in FIG. 4, the system 100 may further comprise a carbon dioxide retention vessel 228. The carbon dioxide retention vessel 228 may be positioned downstream of the separation unit 200, and particularly from the permeate side 223 of the PBI membrane separation unit 220. In at least some embodiments, the system 100 may also comprise a permeate stream compressor 231 for introducing the permeate stream 12 to the PBI membrane separation unit 220.

Further, in at least some embodiments, the carbon dioxide retention vessel 228 may be positioned upstream from a second amount of one or more fluid injection pumps 209, which may be similar, identical, or may actually be the one or more fluid injection pumps 208. These one or more fluid injection pumps 208/209 may be fluidly connected to one or more fluid injection lines 205 connected to a second wellhead 211, which may be fluidly connected to a second wellbore 202 similar to the first wellhead 210. Particularly, although not shown, the second wellbore 202 may also be fluidly connected to the subsurface formation 201, and particularly to a second zone of the subsurface formation 201, whereas the first wellbore 202 is fluidly connected to a first zone of the subsurface formation 201. Accordingly, the system 100 may be configured to supply the permeate stream 12, to the one or more fluid injection pumps 208/209 to form a second foamed acid 4, which may be similar or identical to the first foamed acid 4 except with respect to the partial or complete replacement of the gaseous component with the permeate stream 12.

As previously stated, embodiments herein may be directed to systems 100 of recovering carbon dioxide from a foamed acid 4 hydraulic fracturing operation. The method may utilize any of the systems 100, foamed acids, or hydraulic fracturing compositions hereinbefore described.

As shown in FIG. 1, the method may initially comprise introducing a foamed acid 4 from a surface location 203 into a wellbore 202 fluidly connected to a subsurface formation 201. The method may then comprise exposing the foamed acid 4 to a first zone of the subsurface formation 201, thereby inducing one or more fractures in the first zone of the subsurface formation 201.

As previously stated, a hydraulic fracturing composition 6 may be introduced in addition to the foamed acid 4. Accordingly, in at least some embodiments, and as shown in FIG. 3, the method may further comprise introducing the hydraulic fracturing composition 6 from the surface location 203 into the wellbore 202 after introducing the foamed acid 4. The method may then comprise exposing the hydraulic fracturing composition 6 to the first zone of the subsurface formation 201, thereby increasing a size of the one or more fractures in the first zone of the subsurface formation 201.

As previously stated, it may be desired to recover all or a portion of the foamed acid 4 and/or hydraulic fracturing composition 6, and particularly carbon dioxide therein, if included. Accordingly, in at least some embodiments, the method may further comprise receiving the return portion of the foamed acid 4 from the subsurface formation 201 at the surface location 203 via the wellbore 202, (wherein the return portion(s) are commonly referred to as flowback fluid, and wherein the receiving step may also be commonly referred to as flowing back or as flow back operations). As previously stated, subsurface formation fluids 7 may also be produced from the flow back operations. Accordingly, the return portion of the foamed acid 4 may also comprise the subsurface formation fluids 7.

Similarly, in at least some embodiments, the method may further comprise receiving the return portion of the hydraulic fracturing composition from the subsurface formation 201 at the surface location 203 via the wellbore 202. As previously stated, subsurface formation fluids 7 may also be produced from the flow back operations. Accordingly, the return portion of the hydraulic fracturing composition 6 may also comprise the subsurface formation fluids 7.

Further, referring again to FIGS. 1-4, the method may comprise introducing the return portion of the foamed acid 4, the return portion of the hydraulic fracturing composition 6, or both to a separation unit 200 comprising the PBI membrane 221, thereby forming the permeate stream 12 that may be rich in carbon dioxide (i.e., has relatively more carbon dioxide content than the retentate stream 16) and the retentate stream 16 that may be poor in carbon dioxide (i.e., has relatively less carbon dioxide content than the permeate stream 12).

For example, and in embodiments, introducing the return portion of the foamed acid 4 to the separation unit 200 may comprise exposing the foamed acid 4 to the retentate side 222 of the PBI membrane 221; and permeating the carbon dioxide through the PBI membrane 221 to the permeate side 223, thereby forming the carbon dioxide-rich permeate stream 12 on the permeate side 223 and a carbon dioxide-poor retentate stream 16 on the retentate side 222. In at least some embodiments, the method may further comprise collecting the carbon dioxide-rich permeate stream 12 from the permeate side 223, such as by compressing the permeate stream 12 in the permeate stream compressor 231 and storing the permeate stream 12 in the carbon dioxide retention vessel 228.

Similarly, introducing the return portion of the hydraulic fracturing composition 6 to the separation unit 200 may comprise exposing the hydraulic fracturing composition 6 to the retentate side 222 of the PBI membrane 221; and permeating the carbon dioxide through the PBI membrane 221 to the permeate side 223, thereby forming the carbon dioxide-rich permeate stream 12 on the permeate side 223 and a carbon dioxide-poor retentate stream 16 on the retentate side 222. In at least some embodiments, the method may further comprise collecting the carbon dioxide-rich permeate stream 12 from the permeate side 223, such as by compressing the permeate stream 12 in the permeate stream compressor 231 and storing the permeate stream 12 in the carbon dioxide retention vessel 228.

Still referring to FIG. 4, in those embodiments wherein the separation unit 200 comprises the gas-liquid separator 212 and the PBI membrane separation unit 220, the method may comprise introducing the return portion of the foamed acid 4 the return portion of the hydraulic fracturing composition 6, or both to the gas-liquid separator 212, thereby forming the liquid stream 10 and the gas stream, exposing the gas stream to the retentate side 222, and permeating the carbon dioxide through the PBI membrane 221.

As previously stated, it may be desired to recycle the carbon dioxide recovered in the permeate stream 12.

Accordingly, as shown in FIG. 4, the method may further comprise introducing a second foamed acid 4 from a second surface location 203 into the wellbore 202, the second foamed acid 4 comprising the aqueous solution, the acid, the carbon dioxide, and at least a portion of the permeate stream 12. The method may also comprise exposing the foamed acid 4 to a second zone of the subsurface formation 201, thereby inducing one or more fractures in the second zone of the subsurface formation 201. Similarly as for the first foamed acid 4, the method may also further comprise introducing a second hydraulic fracturing composition 6 from the surface location 203 into the wellbore 202 after introducing the second foamed acid 4. The method may then comprise exposing the second hydraulic fracturing composition 6 to the second zone of the subsurface formation 201, thereby increasing a size of the one or more fractures in the second zone of the subsurface formation 201.

As previously stated, the PBI membrane 221 may in at least some embodiments be susceptible to plugging over time, which may be observed as a reduced permeation rate of the carbon dioxide through the PBI membrane 221. Accordingly, the method may comprise pausing introduction of the return portion of the foamed acid 4, introduction of the return portion of the hydraulic fracturing composition, or both to the separation unit 200 after observing a reduced permeation rate of the carbon dioxide through the PBI membrane 221; introducing the purge gas stream 20 into the permeate side 223 of the PBI membrane 221; permeating the purge gas stream 20 from the permeate side 223 of the PBI membrane 221 to the retentate side 222; and resuming introduction of the return portion of the foamed acid 4, the return portion of the hydraulic fracturing composition 6, or both to the separation unit 200.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

It is also noted that recitations herein of "at least one" component, element, etc., should not be used to create an inference that the alternative use of the articles "a" or "an" should be limited to a single component, element, etc. The singular forms "a," "an" and "the" include plural referents, unless the context clearly dictates otherwise.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising." It is noted that the use of the terms "having" or "including", or grammatical variations thereof, in this disclosure should also be interpreted in like manner as the more commonly used open-ended preamble term "comprising".

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present embodiments herein in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present embodiments including, but not limited to, embodiments defined in the appended claims. More specifically, although some aspects of the present embodiments are identified herein as preferred or particularly advantageous, it is contemplated that the present embodiments is not necessarily limited to these aspects.

What is claimed is:

1. A system for recovering carbon dioxide from a foamed hydraulic fracturing operation, the system comprising:

a wellhead comprising one or more fluid injection lines and one or more fluid return lines, the wellhead fluidly connected to a wellbore that is fluidly connected to a subsurface formation;

one or more fluid injection pumps fluidly connected to the wellhead via the one or more fluid injection lines, the one or more fluid injection pumps configured to supply a foamed acid to the subsurface formation above formation pressure; and a separation unit fluidly connected to the wellhead via the one or more fluid return lines, the separation unit comprising a polybenzimidazole (PBI) membrane configured to separate carbon dioxide.

2. The system of claim 1, wherein the separation unit comprises:

a gas-liquid separator fluidly connected downstream from the wellhead; and a PBI membrane separation unit comprising the PBI membrane fluidly connected downstream from the gas-liquid separator.

3. The system of claim 2, wherein the PBI membrane comprises polybenzimidazole functionalized by 4,4'-(hexafluoro-isopropylidene)bis(benzoic acid) (HFA) or 5-tert-butyl isophthalic acid (Bul).

4. The system of claim 2, wherein the PBI membrane is a single film membrane on a porous support.

5. The system of claim 2, wherein the PBI membrane is a film composite membrane.

6. The system of claim 5, wherein the PBI membrane comprises a plurality of hollow PBI fibers.

7. The system of claim 6, wherein the PBI membrane is a tubular membrane module comprising the plurality of hollow PBI fibers.

8. A method for recovering carbon dioxide from a foamed acid hydraulic fracturing operation, the method comprising:
- introducing a foamed acid from a surface location into a wellbore fluidly connected to a subsurface formation, the foamed acid comprising an aqueous solution, an acid, and carbon dioxide;
- exposing the foamed acid to a first zone of the subsurface formation, thereby inducing one or more fractures in the first zone of the subsurface formation;
- receiving a return portion of the foamed acid from the subsurface formation at the surface location via the wellbore; and
- introducing the return portion of the foamed acid to a separation unit comprising a polybenzimidazole (PBI) membrane, thereby forming a carbon dioxide-rich permeate stream and a carbon dioxide-poor retentate stream.

9. The method of claim 8, wherein introducing the return portion of the foamed acid to the separation unit comprises:
- exposing the return portion of the foamed acid to a retentate side of the PBI membrane;
- permeating the carbon dioxide through the PBI membrane to a permeate side, thereby forming the carbon dioxide-rich permeate stream on the permeate side and a carbon dioxide-poor retentate stream on the retentate side; and
- collecting the carbon dioxide-rich permeate stream from the permeate side.

10. The method of claim 8, wherein:
- the separation unit comprises a PBI membrane separation unit comprising the PBI membrane and a gas-liquid separator fluidly connected upstream of the PBI membrane separation unit; and
- the method further comprises:
  - introducing the return portion of the foamed acid to the gas-liquid separator, thereby forming a liquid stream comprising the aqueous solution and a gas stream comprising the carbon dioxide,
  - exposing the gas stream to a retentate side of the PBI membrane in the PBI membrane separation unit,
  - permeating the carbon dioxide through the PBI membrane to a permeate side, thereby forming the carbon dioxide-rich permeate stream on the permeate side and a carbon dioxide-poor retentate stream on the retentate side, and
  - collecting the carbon dioxide-rich permeate stream from the permeate side.

11. The method of claim 8, further comprising:
- compressing the permeate stream; and
- storing the permeate stream in a carbon dioxide retention vessel.

12. The method of claim 8, further comprising
- introducing a second foamed acid from a second surface location into the wellbore, the second foamed acid comprising the aqueous solution, the acid, the carbon dioxide, and at least a portion of the permeate stream; and
- exposing the foamed acid to a second zone of the subsurface formation, thereby inducing one or more fractures in the second zone of the subsurface formation.

13. The method of claim 9, further comprising:
- pausing introduction of the return portion of the foamed acid to the separation unit after observing a reduced permeation rate of the carbon dioxide through the PBI membrane;
- introducing a purge gas stream into the permeate side of the PBI membrane;
- permeating the purge gas stream from the permeate side of the PBI membrane to the retentate side; and
- resuming introduction of the return portion of the foamed acid to the separation unit.

14. The method of claim 8, wherein the PBI membrane comprises polybenzimidazole functionalized by 4,4'-(hexafluoro-isopropylidene)bis(benzoic acid) (HFA) or 5-tert-butyl isophthalic acid (Bul).

15. The method of claim 8, wherein the PBI membrane is a single film membrane on a porous support.

16. The method of claim 8, wherein the PBI membrane is a film composite membrane on a porous support.

17. The method of claim 8, wherein the PBI membrane comprises a plurality of hollow PBI fibers.

18. The method of claim 17, wherein the PBI membrane is a tubular membrane module comprising the plurality of hollow PBI fibers.

19. The method of claim 8, further comprising:
- introducing a hydraulic fracturing composition from the surface location into the wellbore after introducing the foamed acid, the hydraulic fracturing composition comprising an aqueous solution and a proppant; and
- exposing the hydraulic fracturing composition to the first zone of the subsurface formation, thereby increasing a size of the one or more fractures in the first zone of the subsurface formation, and wherein:
  - receiving the return portion of the foamed acid from the subsurface formation further comprises receiving a return portion of the hydraulic fracturing composition from the subsurface formation at the surface location via the wellbore, and
  - introducing the return portion of the foamed acid to the separation unit further comprises also introducing the return portion of the hydraulic fracturing composition to the separation unit.

20. The method of claim 8, wherein the foamed acid further comprises a foaming agent, a proppant, a gelling agent, a gel stabilizer, a crosslinker, a surfactant, a clay stabilizer, a corrosion inhibitor, a scavenger, or combinations thereof.

* * * * *